United States Patent
Johnson et al.

(10) Patent No.: US 9,503,794 B2
(45) Date of Patent: Nov. 22, 2016

(54) SERVING A LIVE STREAM AS AN ADVERTISEMENT

(71) Applicant: Google Inc., Mountain View, CA (US)

(72) Inventors: Tim Johnson, San Francisco, CA (US); Kevin Greene, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/273,441

(22) Filed: May 8, 2014

(65) Prior Publication Data

US 2015/0326945 A1    Nov. 12, 2015

(51) Int. Cl.
| | |
|---|---|
| *H04N 21/81* | (2011.01) |
| *H04N 21/472* | (2011.01) |
| *H04N 21/2187* | (2011.01) |
| *H04N 21/2343* | (2011.01) |
| *H04N 21/2365* | (2011.01) |
| *H04N 21/432* | (2011.01) |
| *H04N 21/442* | (2011.01) |
| *H04N 21/658* | (2011.01) |

(52) U.S. Cl.
CPC ........ *H04N 21/812* (2013.01); *H04N 21/2187* (2013.01); *H04N 21/2343* (2013.01); *H04N 21/2365* (2013.01); *H04N 21/4325* (2013.01); *H04N 21/44222* (2013.01); *H04N 21/472* (2013.01); *H04N 21/47217* (2013.01); *H04N 21/6581* (2013.01)

(58) Field of Classification Search
IPC .................... H04N 21/812,21/4325, 21/44222, 21/6581, 21/472, 21/47217, 21/2187, 21/2343, 21/2365
See application file for complete search history.

(56) References Cited

U.S. PATENT DOCUMENTS

| | | | | |
|---|---|---|---|---|
| 2008/0115161 | A1* | 5/2008 | Kurzion | 725/32 |
| 2009/0328113 | A1* | 12/2009 | van de Klashorst | 725/87 |
| 2010/0251289 | A1* | 9/2010 | Agarwal et al. | 725/34 |
| 2011/0047567 | A1* | 2/2011 | Zigmond et al. | 725/32 |
| 2012/0230652 | A1* | 9/2012 | Mirsky et al. | 386/241 |

(Continued)

FOREIGN PATENT DOCUMENTS

WO    WO 2012/009135 A1    1/2012

OTHER PUBLICATIONS

PCT International Search Report and Written Opinion for PCT/IB2015/052982, Jul. 8, 2015, 11 Pages.

*Primary Examiner* — Yassin Alata
(74) *Attorney, Agent, or Firm* — Fenwick & West LLP

(57) ABSTRACT

A content server receives live streams from a content distributor to transmit to users of the content server. In one embodiment, the content server promotes the live streams received from the content distributor, by serving portions of the live stream as advertisements (ads) to users of the content server along with videos or digital content requested by the users. The content server buffers the live stream. The content server receives a request for a video from a client device. The content server identifies the video requested by the user and metadata associated with the identified video. The content server, based on the metadata determines whether to serve the client device with a live-stream ad, as a pre-roll ad for example, along with the video requested by the user. The content server then identifies a buffered live-stream ad to transmit to the client device along with the requested video.

17 Claims, 6 Drawing Sheets

(56) References Cited

U.S. PATENT DOCUMENTS

2013/0060629 A1  3/2013  Rangsikitpho et al.
2013/0263180 A1  10/2013  Yang et al.
2014/0100966 A1  4/2014  Bedard et al.
2014/0115625 A1  4/2014  McCoy et al.
2014/0368734 A1* 12/2014  Hoffert et al. ................ 348/564

* cited by examiner

SERVING A LIVE STREAM AS AN ADVERTISEMENT

BACKGROUND

1. Field

The disclosure generally relates to the field of distributing live media or digital content, and in particular, to promoting the live media or digital content.

2. Description of the Related Art

Live streams of media are broadcast to people on a daily basis, thereby allowing viewers to watch live events such as the sports, concerts, and speeches. Many platforms such as YOUTUBE™ stream live streams to users of the platform. However, a challenge faced by a live stream creator or distributor today is reaching an audience for a live stream. Often live stream creators or distributors must expend a huge budget marketing their event months prior to the event occurring to make users aware of the event and encourage users to watch the live stream of the event.

SUMMARY

A content server stores digital content including video, audio, image, animation, or text content, which users of the content server may view and/or upload. For example, users request to view videos via a webpage or mobile device and the content server on receiving a request for a video from a user, provides the user with the video. In one embodiment, the content server receives live media streams from content distributors, and distributes the live streams to users of the content server. The live streams are digital content representing live events, such as a sports match, and are captured in real time. The content server provides the content distributor with the option of promoting live streams as advertisements to users of the content server, thereby making users of the content server aware of a live event available to the users of the content server to view live via the live stream.

Users of the content server often request to view one or more videos stored on, or available via the content server. The content server to promote live streams of live events may provide users with live-stream pre-roll ads along with the requested videos, to make users of the content server aware of a live event captured by a live stream provided by the content server. Users may interact with the live-stream pre-roll ad, pausing the live-stream ad for example, or may choose to view the live stream provided by the content distributor via the content server instead of the video initially requested by the user. Thus, by generating and serving portions of a live stream as a pre-roll ad, the content server makes users of the content server who may be interested in viewing the live stream of a live event aware of the live stream and the current event being captured by the live stream.

To provide the user with a live-stream pre-roll ad, the content server receives and prepares live streams to be served as live-stream pre-roll ads to users of the content server. The content server transcodes the received live streams so a variety of client devices having different video compatibilities may be served a version of the live stream. The content server also buffers the versions of the live stream, thereby allowing the content server to transmit the buffered live stream as an advertisement to the user, providing the user with a smooth, uninterrupted viewing experience.

In one example, the content server provides content distributors with a user interface, via which the content distributors may specify publishing information associated with the live stream. In another example, the content server provides the users of the content server with a user interface to interact with the live-stream ads as the live-stream ads are presented to the users of the content server.

The content server receives a request for a video from a client device. The content server identifies the video requested by the user and metadata associated with the identified video. The content server, based on the metadata determines whether to serve the client device with a live-stream ad, for example as a pre-roll ad, along with the video requested by the user. The content server identifies a buffered live-stream ad to transmit to the client device along with the requested video. In one example, the content server measures the interactions of the user with the live-stream ad, and stores the interactions, for example whether the user interacted with a pause control (served to the user via user interface along with the live-stream ad), thereby pausing the live-stream ad. In another example, the live-stream ad is presented to the user for a period of time, after which the video requested by the user is presented to the user.

BRIEF DESCRIPTION OF DRAWINGS

The disclosed embodiments have other advantages and features which will be more readily apparent from the detailed description and the accompanying figures. A brief introduction of the figures is below.

DETAILED DESCRIPTION

The Figures and the following description relate to particular embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

Figure 1:
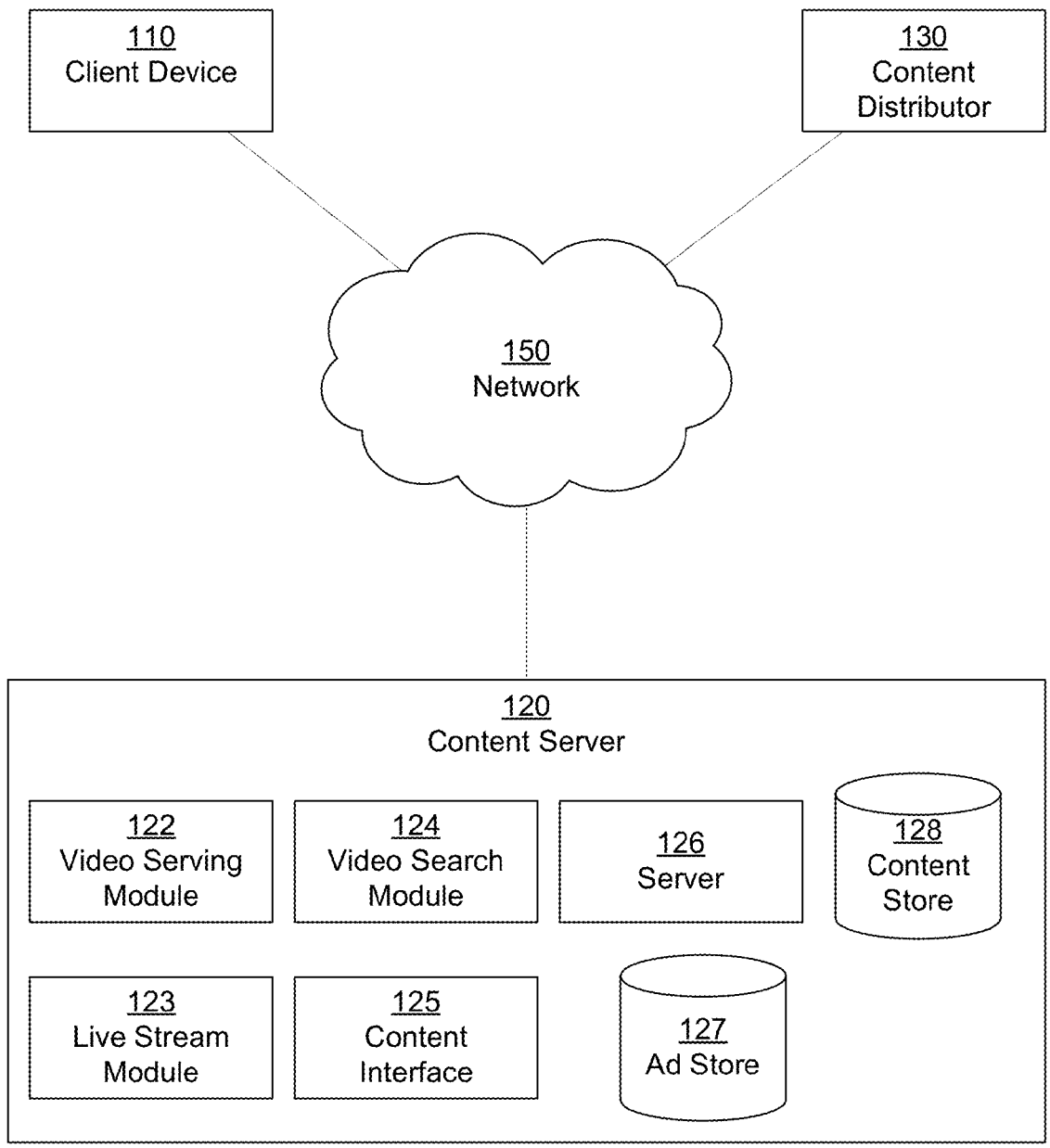
FIG. 1 illustrates a block diagram of a networked environment for sharing digital content, in accordance with one embodiment.

FIG. 1 illustrates a block diagram of a networked environment for sharing digital content, in accordance with one embodiment. The entities of the networked environment include a client device 110, a content server 120, a content distributor 130, and a network 150. Although single instances of the entities are illustrated, multiple instances may be present. For example, multiple client devices 110 associated with multiple users may retrieve digital content, and present digital content. The functionalities of the entities may be distributed among multiple instances. For example, a content distribution network of servers at geographically dispersed locations implements the content server 120 to increase server responsiveness and to reduce digital content loading times.

The client device 110 accesses digital content through the network 150 and presents digital content to a user. Presenting digital content includes playing a video or audio file as well as displaying an image or animation. In one embodiment, the client device 110 is a computer, which is described further below with respect to FIG. 4. Example client devices 110 include a desktop, a laptop, a tablet, a mobile device, a smart television, and a wearable device. Using the client device 110, a user may upload and manage digital content on the content server 120, which also includes creating live streams and managing live streams captured using the client device 110. The client device 110 may contain software such as a web browser or other application for viewing digital content from the content server 120. The client device 110 may include software such as a video player, an audio player, or an animation player to support presentation of embedded digital content.

The content distributor 130 is a computer system that provides one or more live streams to the content server 120. Example content distributors 130 include a desktop, a laptop, a smartphone, a tablet, a mobile device, a camera or a video recording device. A content distributor 130 may generate a live feed of media content and transmit the live feed to the content server 120 as a live stream. A content distributor 130 may be operated, for example, by a television network, a radio station, a concert producer, an individual user that generates live media content, or any other entity that generates live media content. In one example, a content distributor 130 may receive a live stream from another system and forward the live stream to the content server 120 to be distributed to users of the content server 120.

In one embodiment, for a live stream transmitted by a content distributor 130 to the content server 120, the content distributor 130 also transmits to the content server 120 publishing information associated with the live stream. The publishing information includes instructions related to the distribution of the live stream, such as whether portions of the live stream may be used as an advertisement, or demographics to whom the content distributor 130 would like to promote the live stream. The content distributor 130 may transmit the publishing information of a live stream prior to transmitting the live stream to the content server 120. In one example, the content server 120 provides the content distributor 130 with a user interface to select various instructions to include in the publishing information, as described in greater detail in conjunction with the content server 120 below.

The network 150 enables communications among the entities connected to them through one or more local-area networks and/or wide-area networks. In one embodiment, the network 150 is the Internet and uses standard wired and/or wireless communications technologies and/or protocols. The network 150 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the networks 170, 160 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP).

The data exchanged over the network 150 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

The content server 120 stores digital content uploaded by users of client devices 110 and serves this digital content to viewing users of client devices 110. The content server 120 may also acquire digital content from content owners (e.g., production companies, record labels, publishers). The content server 120 also receives live streams of events from a content distributor 130 and transmits, publishes or makes available the live stream to users of the content server 120. In one embodiment, the content server 120 includes a video serving module 122, a live stream module 123, a video search module 124, a content interface 125, a server 126, an advertisement (ad) store 127, and a content store 128. The functionality of the illustrated components may be duplicated or redistributed among a different configuration of modules.

The content server 120 stores uploaded digital content in the content store 128. The content store 128 may include the digital content itself (e.g., the audio or video file) or a pointer thereto. The content store 128 also houses metadata associated with the digital content. Metadata are properties of the digital content that indicate the digital content's source (e.g., an uploader name, an uploader user identifier) and/or attributes (e.g., a video identifier, a title, a description, a file size, a file type, a frame rate, a resolution, an upload date).

In one example, the metadata associated with the digital content includes an ad identifier identifying a type of ad that may be displayed during, before or after playback of the digital content. These types of ads are referred to as a pre-roll ad (played prior to playback of the digital content), a mid-roll ad (played during the playback of the digital content, where the playback of the digital content is stopped for the mid-roll ad to be played), a post-roll ad (played after the play back of the media content), and an overlay ad (played during playback of the media content, however the ad is an animation or text laid over a portion of the digital content during playback of the digital content). In another example, the ad identifier associated with the digital content specifies whether a live stream may be played as a pre-roll ad displayed to the user prior to playback of the digital content.

The client device 110 requests digital content by accessing a uniform resource identifier (URI), typically a uniform resource locater (URL), corresponding to the digital content. In one embodiment, the URI includes a domain associated with the content server 120 and a content identifier, identifying the digital content requested by the client device 110.

Based on the content identifier, the video serving module 122 retrieves videos from the content store 128 and makes them available to the client device 110, via the content interface 125 for example.

The content interface 125 presents the digital content to users of the client device 110 via an application or browser executing on the client device 110. In one embodiment, the content interface 125 presents the user with an interface via which the user may interact with a live stream presented to the user as a pre-roll ad. In one embodiment, the interface includes a set of controls allowing the user to manipulate the playback of the live stream, as well as allowing the user to redirect to the live stream or skip and continue to a video requested by the user. For example, the user interface includes controls for pausing, rewinding or fast forwarding through a live stream presented to the user as an ad or as a pre-roll ad. In another example, the user interface may include a control for skipping over the live-stream pre-roll ad to the video requested by the user. In one instance the control for skipping over the live-stream pre-roll ad may be available to the user after the buffered live stream has been viewed by the user for a threshold period of time. For example, the user may have to view the live-stream ad for 5 seconds prior to being able to interact with the control to skip over the remaining portion of the live-stream pre-roll ad to the video requested by the user. The user interface may also include a control for redirecting the user to the live stream of the live event being captured by the content distributor 130.

In one embodiment, the content interface 125 provides a user interface to content distributors 130, using which a content distributor 130 may select publishing information to include with the live stream created by or recorded by the content distributor 130. The user interface provided to the content distributor 130 may include a set of filters, input fields or options that the content distributor may enter or select to specify information to include in the publishing information. Examples of information that may be included in the publishing information include, information specifying the time period during which the live stream may be promoted, the demographic of users to whom the content distributor would like to provide the live stream, or whether or not the live stream may be served as an ad or a pre-roll ad to users of the content server 120. The user interface may be provided to the content distributor 130 as the content distributor creates the live stream, or any time during which the live stream is transmitted to the content server 120. This allows the content distributor to modify the restrictions or limitations associated with the live stream, before or during the transmission of the live stream to the content server 120.

The video search module 124 enables a user to search for videos meeting one or more specified criteria, or which are related to other videos the user has viewed, promoted by the video hosting site, and the like.

The live stream module 123 receives a live stream from a content distributor 130 via a media capturing device and prepares the live stream to be served to users of the content server 120 or to be promoted and served as an ad to users of the content server 120, as described in greater detail in conjunction with FIG. 2, FIG. 3 and FIG. 4 below. In one embodiment the live stream module 123 transcodes the live stream into multiple transcoded versions of the live stream, thereby allowing the content server 120 to transmit or serve the live stream to users with client devices 110 having different decoding capabilities and different video player compatibilities. The live stream module 120 may buffer the live stream for a threshold period of time to be served to a user. For example, the buffered live stream may be served to the user as an advertisement, or the buffered live stream may be served to users interested in watching the live event. The buffered live stream may be stored in either the ad store 127 or the content store 128. In one embodiment, the live stream module 123 stores the live stream in the content store 128. This allows users who were not able to view the live stream at the time of the live event to retrieve and view the live stream after the completion of the live event.

In one example, the live stream module 123 generates a live-stream ad based on the publishing information received from the content distributor 130. In another example, the live stream module 123 serves live streams as a pre-roll ad prior to displaying a video requested by a user. Serving a live stream as a pre-roll ad is an effective way of making users of the content server 120 aware of a live event the user may be interested in viewing, occurring at the time the user is displayed the live-stream pre-roll ad. Furthermore, users may interact with the live-stream ad to redirect to the live stream for example. In one embodiment, the live-stream ad generator 123 determines whether to serve a live stream as a pre-roll ad based on metadata associated with the requested video. For example, the content server 120 receives a request for a video from a client device 110. The live stream module 123 retrieves metadata associated with the requested video and identifies from the metadata that a live-stream ad is to be served to the user along with the requested video. The live stream module 123 then retrieves a buffered live stream stored in the ad store 127 and provides the video serving module 122 with the buffered live stream to be served as a live-stream ad along with the requested video to the client device 110. In the following examples live streams are discussed as being served as pre-roll ads, however live streams or portions of live streams may also be served as mid-roll, post-roll or overlay ads in other embodiments.

The live stream module 123 may store buffered portions of a live stream in the ad store 127. Buffering the stream allows the content server 120 to provide the user viewing the live stream as a pre-roll ad a smooth and desirable viewing experience. Buffering refers to storing a portion of the live stream for a time interval. The live stream module 123 may retrieve a buffered live stream or a portion of a buffered live stream from the ad store 127 to be served to a user as a live-stream ad. The ad store 127 stores ads of different kinds as well as advertising creatives. Ad store 127 also stores information related to each advertiser, such as account information and credentials, and campaign preferences for any advertising campaigns in which the advertiser is involved. In one embodiment, the ad store 127 stores metadata associated with each ad identifying whether the ad is one or more of a pre-roll, mid-roll, post-roll or overlay ad. The ad store 127 may also store metadata associated with live-stream ads including the publication information associated with the live stream ad.

The server 126 links the content server 120 via the network 150 to the client devices 110 as well as to the content distributor 130. The server 126 serves web pages, application content or instructions, as well as other content, such as JAVA®, FLASH®, XML and so forth. The server 126 may receive uploaded content items from the one or more client devices 110. Additionally, the server 126 communicates instructions from the content interface 125 for viewing digital content and for processing received input from a user of a client device 110 to the respective component of the content server 120 for processing. Additionally, the server 126 may provide application programming interface (API) functionality to send data directly to native client device operating systems, such as IOS®, ANDROID™, WEBOS® or BlackberryOS. In the examples that follow the server 126 is described as providing the client device 110 with web pages for display to the user, however the server 126 may also provide an application installed on the client device 110 with content to display to the user.

Figure 2:
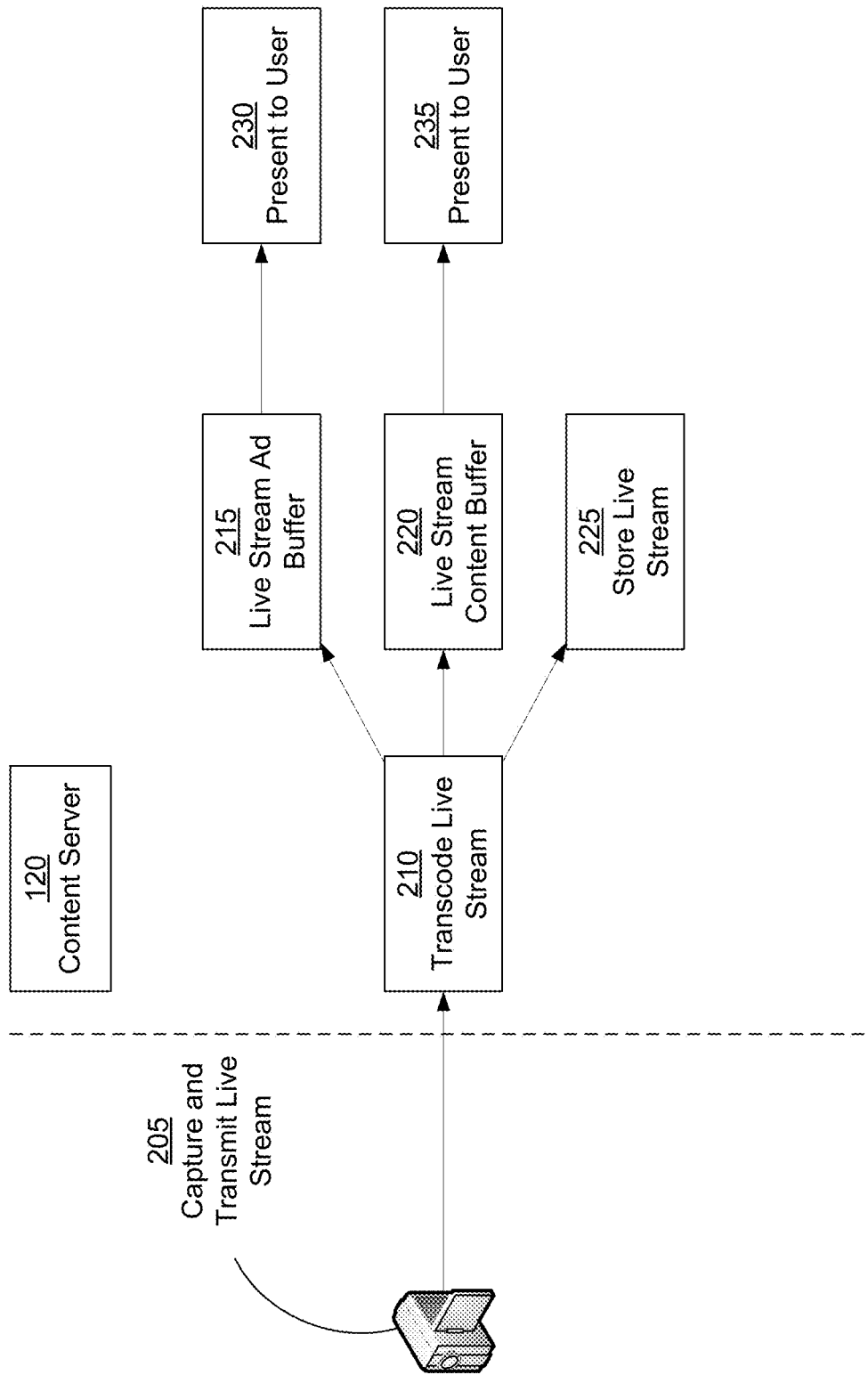
FIG. 2 illustrates an example flow of a live stream from a content distributor to a user of the content server in accordance with one embodiment.

FIG. 2 illustrates an example flow of a live stream from a content distributor to a user of the content server, according to one embodiment. The content distributor 130 captures and transmits 205 a live stream to content server 120. In one embodiment, the media captured by the content distributor is a live feed that is being generated as it is being streamed within the network 150. The content server 120 receives the live stream from the content distributor 130 as it is being captured. The content server 120 transcodes 210 the live stream creating multiple versions of the live stream. The transcoded 210 live stream may buffered or stored in a variety of ways.

In one example, live stream module 123 buffers the live stream in live-stream ad buffer 215. The portion of the live stream stored in live-stream ad buffer 215 is dependent on the needs of the implementer, and may vary for example based on the amount of storage available to be dedicated to buffer storage. The buffered live stream is presented 230 to a user of content server 120 as a live-stream ad. In one embodiment, live stream module 123 stores an indicator in ad store 127 indicating that a portion of the live stream is buffered in live-stream ad buffer 215, and is available for presentation to a user as a live-stream ad. In another example, live stream module 123 also buffers the live stream in live stream content buffer 220, which in various embodiments may be the same or a different buffer than live-stream ad buffer 215, and may be of larger or smaller size. The portion of the live stream stored in live stream content buffer 220 is then presented 235 to users interested in viewing the live stream as the live event is being captured by the content distributor 205. In some embodiments, users interested in viewing different portions of the live stream, such as portions of the live event that may have already occurred may view or seek back to those portions stored in the live stream content buffer 220 via a user interface provided to the users. For example, a user being shown a live-stream ad may be redirected to the content in the live-stream content buffer 220 to seek back two minutes by using controls displayed as part of the player displaying the live-stream ad. In a third example, the transcoded 210 live stream may be stored 225 in the content store 128, and presented 240 to users interested in viewing the live stream at a time after the live event has occurred or has been completed.

Figure 3:
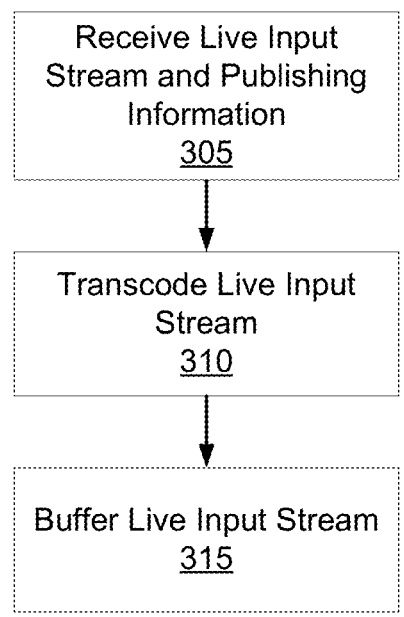
FIG. 3 is a flowchart of an example process for receiving and buffering live streams, in accordance with one embodiment.
Figure 4:
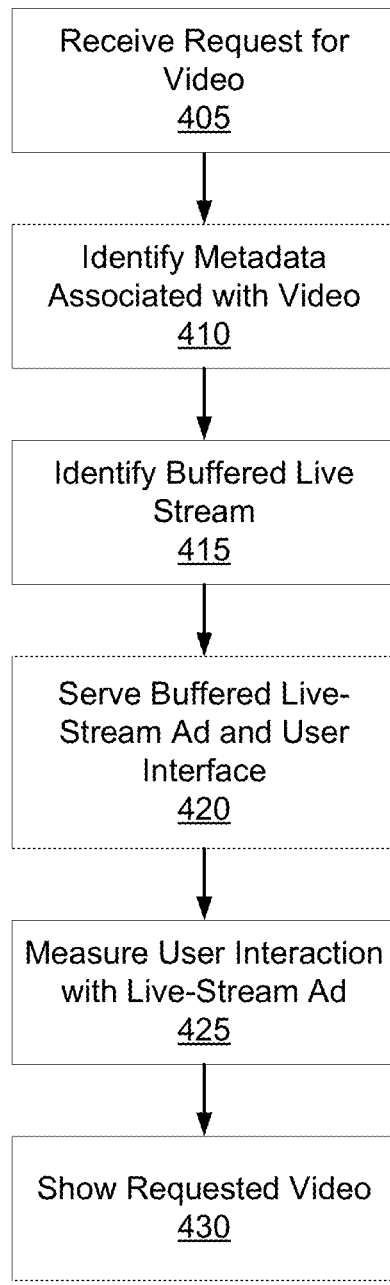
FIG. 4 is a flowchart of an example process for serving a buffered live stream as an advertisement, in accordance with one embodiment.

FIG. 3 and FIG. 4 illustrate flowcharts of an example process for preparing and serving live-stream ads, in accordance with one embodiment. FIG. 3 illustrates an example process for receiving a live stream from a content distributor and generating a live-stream ad to be served to a user of content server 120. FIG. 4 illustrates an example process for serving a live-stream ad along with a video requested by a user of the content server 120. In the illustrated embodiment, the digital content item is a video and the content identifier is a video identifier; however, the process described herein is fully applicable to other digital content such as audio files, images, animations, or text. Further, the functionality described in conjunction with FIG. 3 and FIG. 4 is performed by the live stream module 123; however, in other embodiments, any suitable component or combination of components may perform the functionality described in conjunction with FIG. 3 and FIG. 4. Additionally, in some embodiments, different and/or additional steps than those identified in FIG. 2 and FIG. 3 may be performed or the steps identified in FIG. 3 and FIG. 4 may be performed in different orders.

FIG. 3 illustrates an example process for receiving a live stream from a content distributor and generating a live-stream ad to be served to a user of the content server 120. The content server 120 receives 305 a live input stream from a content distributor 130. The live input stream captured by the content distributor 130 is a live feed that is being generated as it is being streamed within the network 150. In one embodiment, the content server 120 also receives 305 publishing information pertaining to the distribution and promotion of the live stream. For example, the publishing information includes information specifying the time period during which the live stream may be promoted, the demographic of users to whom the content distributor would like to provide the live stream, or whether or not the live stream may be served as a pre-roll ad to users of the content server 120. The publishing information may be received concurrently with, or prior to the live stream. For example, as the content server 120 receives the live stream the content server 120 may also receive publishing information indicating whether the received portions of the live stream should be included in a pre-roll ad to be served to users. This is beneficial to the content distributor as it allows the content distributor to promote the live streaming of a live event during the active periods of the live event, as users may not be interested in viewing the down times during a live event, such as when music bands change during a concert or when there is an interval between periods in a hockey game.

As the live stream is received by the content server 120, the content server 120 in one embodiment transcodes 310 the live stream, to create multiple versions of the live stream. Transcoding refers to the conversion of one encoding to another. Transcoding the live stream into multiple transcoded versions of the live stream allows the content server 120 to transmit or serve the live stream to users with client devices 110 having different encoding capabilities and different video player compatibilities. Apart from creating versions of different formats or encoding, the content server 120 may create different transcoded version of the live stream each having a different resolution quality. For example, for a received live stream, the content server 120 creates different versions of the live stream, each version with one of the following resolutions qualities: 144p, 240p, 360p, 480p, 720p, and 1080p. Depending on the viewing capabilities of client device 110, content server 120 can then select the most appropriate version of the content to stream to the device from among the various transcoded streams.

Content server 120 buffers 315 the transcoded live input stream. Buffering the stream allows the content server 120 to provide the user viewing the live stream as a pre-roll ad a smooth and desirable viewing experience. Buffering refers to storing a portion of the live stream for a time interval. Buffering the live input stream allows the content server 120 to account for the difference between the rate at which the data is received by the content server 120 and the rate at which the transcoded live input stream is served to a client device 110, thereby allowing a user to view the live input stream as a pre-roll ad for example, without any interruptions as the input stream is transmitted to the client device 110. In on embodiment, the content server 120 buffers each transcoded version of the live stream by storing video frames or portions of the live stream over a threshold time interval (e.g., 2 minutes) in the ad store 127. In another embodiment, the content server 120 removes the oldest buffered live stream frame from the buffer on receiving a new frame or portion of the live input stream from the content distributor.

In another embodiment, the content server 120 begins buffering content from the content distributor 130 based on the time information present included in the publishing information provided by the content distributor 130. For example, the content distributor 130 may indicate that a live stream be buffered or published from 10:00 am to 11:00 am. The content distributor 130 may begin buffering the live stream received from the content distributor at 10:00 am and may stop buffering the live stream at 11:00 am. Further, the entire live stream or buffered portions of the live stream may be stored in the ad store 127 or the content store 128 for later use by the content server 120. For example, on receiving an interaction from the user with respect to a control presented to the user via a user interface (as the user views a live-stream ad), to go back prior to the time period at which the content server 120 began buffering the live stream, the content server 120 retrieves either a buffered version or a stored version of the live stream associated with a time interval prior to the time period at which the content server 120 began buffering the live stream to present to the user. The content server 120 may also redirect the user away from the live-stream ad presented to the user, to an interface displaying the retrieved stored version of the live stream for the user to view.

FIG. 4 illustrates the example process for serving a live-stream ad along with a video requested by a user of the content server 120. The content server 120 may receive 405 a request for a video from the client device 110. In one embodiment, the content server receives 405 the requested URI indicating a video a user is interested in viewing through the server 126. From the received URI, the content server 120 may extract a video identifier identifying the video the user is interested in viewing. The video identifier may be embedded as parameters in the URI.

Based on the video identifier the content server 120 identifies the requested video in the content store 128 and identifies 410 metadata associated with the requested video. In one embodiment, the content server 120 identifies metadata specifying whether a pre-roll ad is to be served to the user prior to playback of the requested video, and whether the pre-roll ad may be a live-stream ad. In addition to identifying the type of ad to be served to the user along with the requested video the content server 120 may also identify other metadata associated with the video such as the frame rate at which the video should be served.

Based on the metadata associated with the type of ad to be served with the video the content server 120 identifies 415 a buffered live stream to present to the user as a pre-roll ad. For example, the content server 120 identifies a buffered live stream to serve the user based on characteristics associated with the user, such as the demographic of the user or previous videos in which the user has expressed interest or viewed. In another example, the content server 120 identifies a live stream to serve the user based on the type or characteristics of the video requested by the user. For instance, the content server 120 may serve the user a buffered live stream of a live event including a band of the same genre as that of a music video requested by the user. The buffered live stream portion served to the user as an advertisement may represent the most recent content of the live event captured by the content distributor 130 or may represent content of the live event previously captured by the content distributor 130 and provided to the content server 120. In a third example, the content server 120 identifies a buffered live stream to serve to the requesting user based on the location of the user. The content server 120 may select a buffered live stream of a live event occurring at a location within a threshold distance of the user, to serve to the user as a pre-roll ad. The content server 120 may select a buffered live stream to serve to the user based on the user's geographic location as indicated by the metadata associated with the requested video, or the publishing information associated with the live stream. In one example, the content server 120 selects a buffered live stream to serve to a user as a pre-roll ad if the user is located in the United States of America, and selects a pre-roll ad which is not a live stream to serve to a user located in Brazil.

In a fourth example, the content server 120 identifies a buffered live stream to serve to the user based on the publishing information associated with the live stream. For example, the publishing information specifies a time interval within which the buffered live stream may be served as an ad to a user. The content server 120 only serves the buffered live stream to the requesting user, if the request for a video is made by the user during the time interval included in the publishing information. In one embodiment, the content server 120 identifies a set of buffered live streams generated within a time interval of receiving the request for a video from the client device 110. The content server 120 may select one of the buffered live streams from the set of buffered live streams to present to the user as a pre-roll ad.

Figure 5:
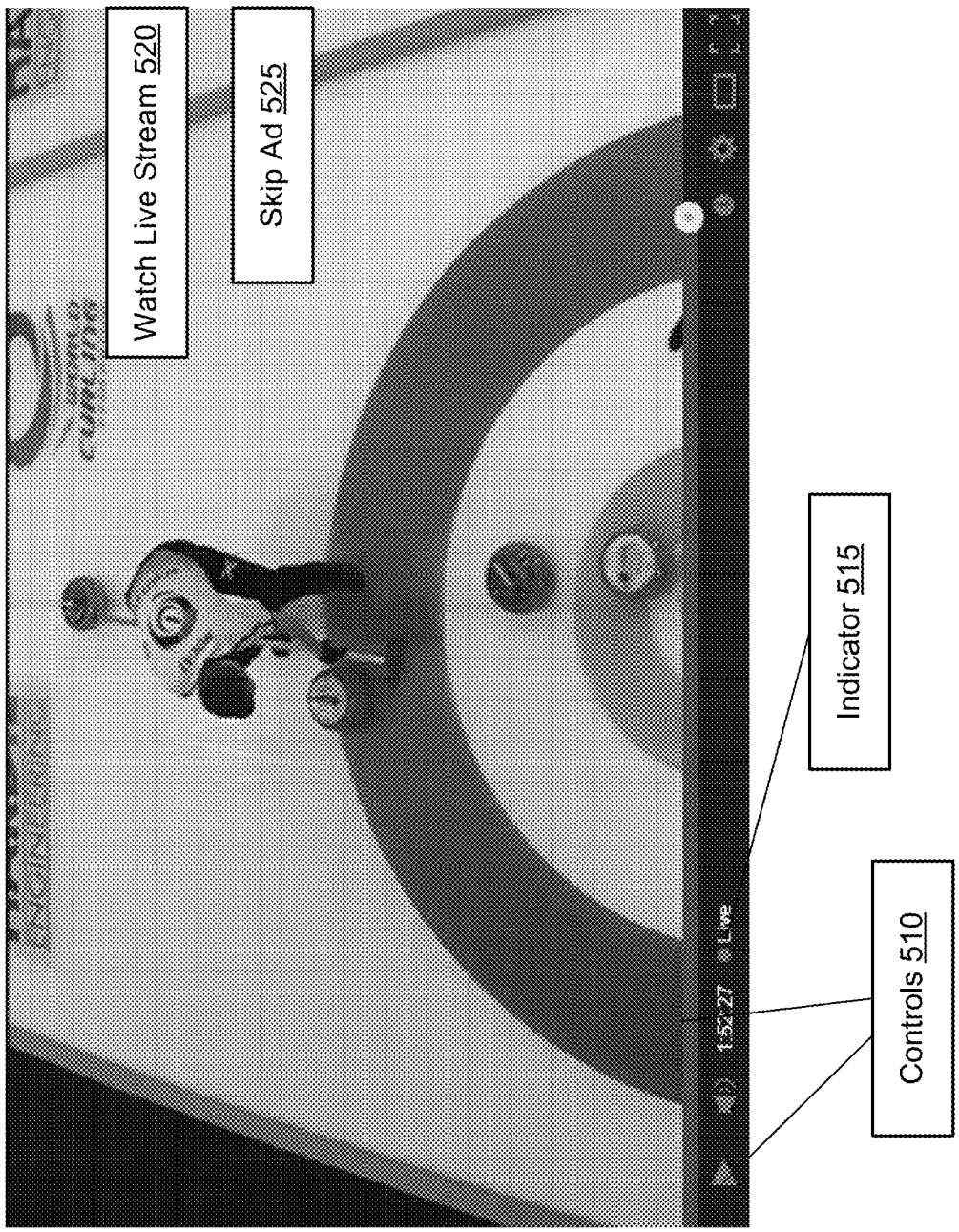
FIG. 5 illustrates example controls presented to a user via a user interface along with a live-stream pre-roll ad, in accordance with one embodiment.

The content server 120 serves the buffered live stream to the requesting client device 110 or user, in one example to be viewed as a pre-roll ad prior to playback of the video requested by the user. In one example, the content server 120 serves the buffered live stream via a content interface 125 or a web page generated by the server 126. In one example, in addition to serving the user the buffered live stream as a pre-roll ad, the content server 120 provides the client device 110 with a user interface to present to the user. In one embodiment, the user interface includes a variety of functions which when interacted with by the user, may affect the playback of the buffered live stream or triggers events that may occur during or after playback of the buffered live stream or a portion of the buffered live stream. For example, as shown in FIG. 5, the user interface includes controls 510 for pausing, rewinding or fast forwarding through the buffered live stream. In another example, the user interface may include a control, such as a control labelled "Skip Ad" 525 for skipping the live-stream pre-roll ad to the video requested by the user. In one instance the control for skipping the live-stream pre-roll ad may be available to the user after the buffered live stream has been viewed by the user for a threshold period of time. The user interface may also include a control, such as a control labelled "Watch Live Stream" 520 for redirecting the user to the live stream of the live event being captured by the content distributor 130. The user interface may also include an indicator 515, labelled "Live" in this example, for identifying whether the current portion of the live stream being viewed by the user is live. In the above examples live streams are discussed as being served as pre-roll ads, however live streams or portions of live streams may also be served as mid-roll, post-roll or overlay ads in other embodiments.

In one embodiment, the content server 120 measures 425 the user's interactions with the live-stream pre-roll ad or the user interface presented to the user along with the live-stream pre-roll ad. For example, in addition to providing the user with controls to interact with the live-stream ad, the user interface may measure and record the interactions made by the user with respect to the live-stream ad. For example, the content server 120 determines if the user interacted with a control presented by the user interface, such as the control to skip the live-stream pre-roll ad, and stores the information identifying the interaction as metadata associated with the buffered live stream ad in the ad store 127. The content server 120 may then at a later time use the measured interactions to perform a variety of functions. For example, the content server 120, based on the interactions of the user with one or more live-stream ads, determines if the user prefers viewing live-stream ads over conventional ads, or whether the user is responsive to live-stream ads. For example, if a user has previously interacted with a variety of controls associated with live-stream pre-roll ads, the content server 120 may actively serve the user with live-stream pre-roll ads on receiving requests from the user to view videos hosted by the content server 120.

The content server 120, after displaying the live-stream pre-roll ad to the user, shows 430 or displays the video requested by the user. In one embodiment, the server 126 is configured to provide the user with a web page including the live-stream pre-roll ad followed by the video requested by the client device. In another embodiment, the video requested by the user is immediately played back to the user on receiving an interaction with a control associated with the user interface of the live-stream ad causing the user interface to skip playing the live-stream ad and proceed with displaying the requested video to the user. In another embodiment, the content server 120 displays the requested video to the user after the live-stream pre-roll ad has played for a threshold time. For example, the live-stream pre-roll ad plays for 30 seconds, after which the video requested by the user is showed to the user. In one example, on receiving a user interaction with the ad, such as if the user clicks on the live-stream ad, the user may be redirected to the live stream or a web page displaying the live stream.

Figure 6:
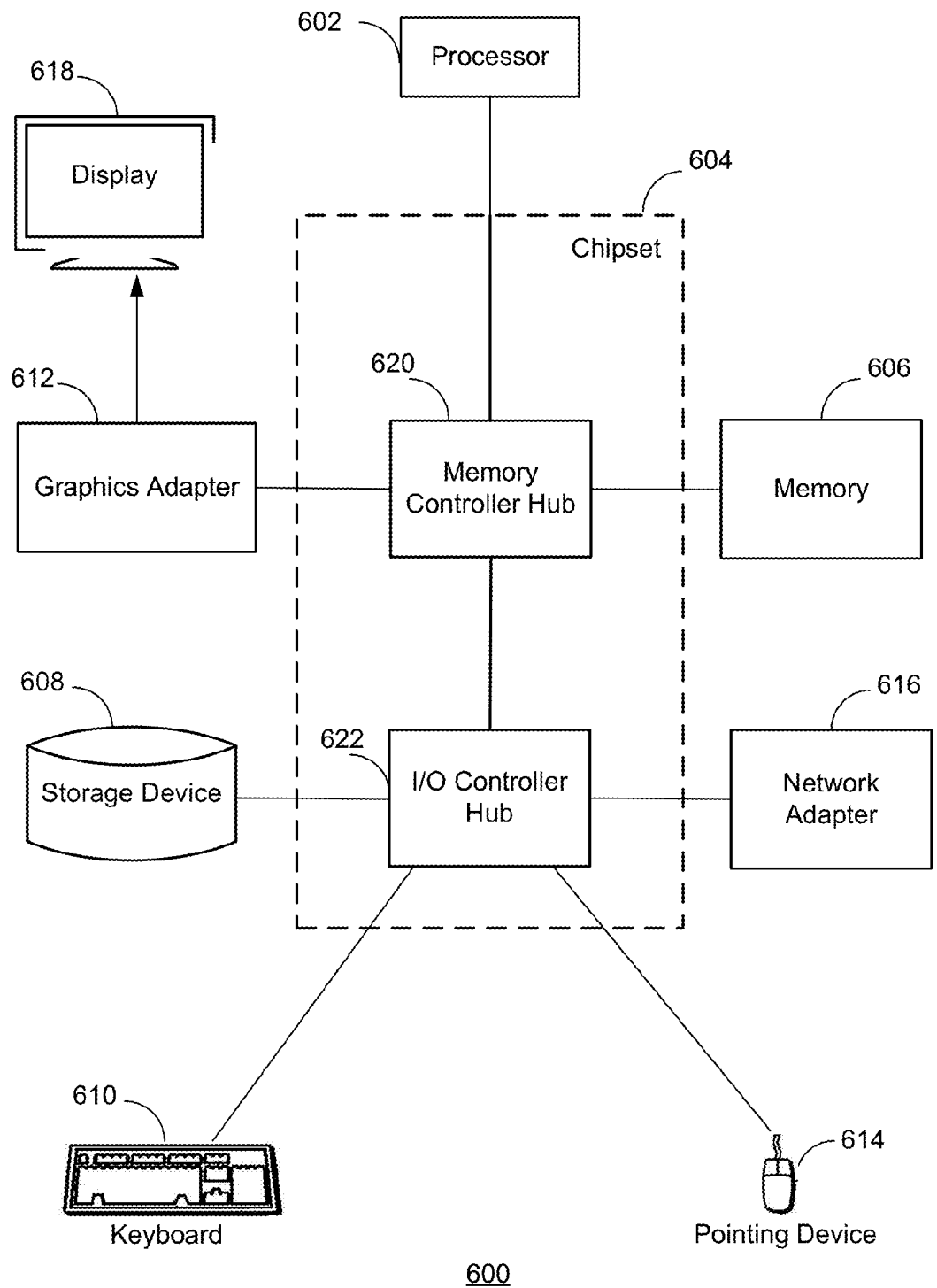
FIG. 6 is a block diagram illustrating an example computer usable to implement entities of the content sharing environment, in accordance with one embodiment.

The client device 110, the content server 120, and the content distributor 130 may be implemented using one or more computers. FIG. 6 is block diagram illustrating an example computer 600 usable to implement entities of the content sharing environment, in accordance with one embodiment.

The computer 600 includes at least one processor 602 (e.g., a central processing unit, a graphics processing unit) coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The processor 602 may include one or more processors 602 having one or more cores that execute instructions. The pointing device 614 is a mouse, track ball, or other type of pointing device, and is used in combination with the keyboard 610 to input data into the computer 600. The graphics adapter 612 displays digital content and other images and information on the display 618. The network adapter 616 couples the computer 600 to one or more computer networks (e.g., network 150).

The computer 600 is adapted to execute computer program modules for providing functionality described herein including presenting digital content, playlist lookup, and/or metadata generation. As used herein, the term "module" refers to computer program logic used to provide the specified functionality. Thus, a module can be implemented in hardware, firmware, and/or software.

The types of computers 600 used by the entities of the content sharing environment can vary depending upon the embodiment and the processing power required by the entity. For example, the content server 120 might comprise multiple blade servers working together to provide the functionality described herein. The computers 600 may contain duplicates of some components or may lack some of the components described above (e.g., a keyboard 610, a graphics adapter 612, a pointing device 614, a display 618). For example, the content server 120 run in a single computer 600 or multiple computers 600 communicating with each other through a network such as in a server farm.

Although the foregoing description has focused primarily on videos for purposes of providing a concrete illustration, various embodiments may incorporate different types of digital content in different forms of playlists. In one embodiment, the content server 120 contains audio files in playlists, which may be presented through an audio player instead of a video player. It should be noted that videos may contain audio files as well. As another embodiment, the content server 120 contains images and/or animations organized in albums instead of playlists. Rather than using a video or an audio player, these images and/or animations may be presented in a slideshow, which may contain auto-play functionality (e.g., the slideshow retrieves a next image or animation after a period of time). In yet another embodiment, the digital content includes text, which may be organized into textual collections (e.g., chapters in a book, installments in a short story series, poems in an anthology). Digital content may include combinations of video, audio, images, animations, and/or text.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. To implement these operations, the content server 120 may use a non-transitory computer-readable medium that stores the operations as instructions executable by one or more processors. Any of the operations, processes, or steps described herein may be performed using one or more processors. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for a content sharing environment. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

We claim:

1. A computer-implemented method for providing advertisements for live events, the method comprising:
  receiving, by a content server system, a live stream;
  storing, by the content server system, a portion of the live stream;
  receiving, by the content server system from a client device a user request for a video content, the live stream not including the video content;
  determining, by the content server system, that a live-stream advertisement is to be served to the client device, the live-stream advertisement advertising the live stream and including the portion of the live stream;
  providing, by the content server system to the client device, the live-stream advertisement, the live stream advertisement displayed by the client device to a user without displaying the video content;
  providing, by the content server system to the client device, instructions for the client device to display with the portion of the live stream a first control and a second control selectable by the user, the first control associated with terminating the display of the portion of the live stream and initiating display of the video content, and the second control associated with displaying the live stream instead of the video content; and
  responsive to the user selecting the second control, providing, by the content server system to the client device, content of the live stream, the content of the live stream displayed to the user instead of the video content, the content of the live stream not included in the stored portion.

2. The method of claim 1 wherein the determination that a live-stream advertisement is to be served is based on metadata associated with the video content.

3. The method of claim 1 further comprising:
  providing to the client device the requested video content following the display of the portion of the live stream on the client device.

4. The method of claim 1, wherein the portion of the live stream is identified from among a plurality of transcoded versions of an original live stream received from a content distributor.

5. The method of claim 1, further comprising:
  providing to the client device, along with the portion of the live stream, a user interface, the user interface configured to include additional controls which when interacted with by the user, manipulate the playback of the live stream.

6. The method of claim 5, wherein manipulating the playback of the portion of the live stream includes at least one of pausing the display of the portion of the live stream, rewinding through the portion of the live stream, replaying the portion of the live stream or fast forwarding through the portion of the live stream.

7. The method of claim 1, further comprising:
  providing, to the client device along with the portion of the live stream, a user interface, the user interface configured to include additional controls the user may interact with;
  measuring the interactions of the user with the additional controls; and
  storing the measured interactions.

8. A method comprising:
  receiving from a content distributor a live stream;
  generating multiple versions of the live stream by transcoding the live stream;
  generating a buffered live stream for each of the multiple versions of the live stream by buffering each of the multiple versions of the live stream for a threshold period of time;
  receiving a request for a video content from a client device, the video content not included in the live stream;
  providing to the client device an advertisement advertising the live stream, the advertisement including the buffered live stream generated for a version from the multiple versions, the advertisement displayed by the client device to a user without displaying the video content;
  providing to the client device instructions for the client device to display with the buffered live stream a first control and a second control selectable by the user, the first control associated with terminating the display of the buffered live stream and initiating display of the video content, and the second control associated with displaying the live stream instead of the video content; and
  responsive to the user selecting the second control, providing to the client device content of the live stream from the version associated with the buffered live stream of the advertisement, the content of the live stream displayed to the user instead of the video content, the content of the live stream not included in the buffered live stream of the advertisement.

9. The method of claim 8, further comprising:
providing to the content distributor a user interface configured to receive publishing information associated with the live stream.

10. The method of claim 9, wherein the publishing information comprises information specifying a time interval during which the live stream may be presented to users, information specifying whether the live stream may be promoted as an advertisement or information specifying a demographic to target while promoting the live stream as an advertisement.

11. The method of claim 10, further comprising:
selecting the buffered live stream to present based on the publishing information associated with the live stream.

12. The method of claim 8, further comprising:
selecting the buffered live stream to present based on metadata associated with the requested video content, the metadata specifying a type of advertisement that may be presented with the video content.

13. A content sharing system, comprising:
a content database storing a plurality of video content and metadata associated with the video content;
an advertisement database storing a plurality of live-stream advertisements;
a content server comprising:
  a processor; and
  a non-transitory computer readable storage medium storing computer-executable instructions that when executed cause the processor to perform steps including:
  receiving a live stream;
  storing a portion of the live stream;
  receiving from a client device a user request for a video content from the plurality of video content, the live stream not including the requested video content;
  determining, from metadata associated with the requested video content, that a live-stream advertisement from the plurality of live-stream advertisements is to be served to the client device, the live-stream advertisement advertising the live stream and including the portion of the live stream;
  providing to the client device the live-stream advertisement, the live-stream advertisement displayed by the client device to a user without displaying the requested video content;
  providing to the client device instructions for the client device to display with the portion of the live stream a first control and a second control selectable by the user, the first control associated with terminating the display of the portion of the live stream and initiating display of the requested video content, and the second control associated with displaying the live stream instead of the requested video content; and
  responsive to the user selecting the second control, providing to the client device content of the live stream, the content of the live stream displayed to the user instead of the requested video content, the content of the live stream not included in the stored portion.

14. The content sharing system of claim 13, further comprising:
providing to the client device the requested video content following the display of the portion of the live stream on the client device.

15. The content sharing system of claim 13, further comprising:
providing, to the client device along with the portion of the live stream, a user interface, the user interface configured to include additional controls the user may interact with;
measuring the interactions of the user with the additional controls; and
storing the measured interactions.

16. A method for viewing video content, the method comprising:
requesting, by a client device, a video content from a server;
receiving, at the client device, an advertisement advertising a live stream, the advertisement including a portion of the live stream;
displaying, by the client device, the advertisement advertising the live stream without displaying the requested video content;
displaying, by the client device, with the portion of the live stream a first control and second control based on instructions received from the server;
responsive to a user of the client device selecting the first control while the portion of the live stream is being displayed, terminating, by the client device, the display of the portion of the live stream and initiating display of the requested video content; and
responsive to the user of the client device selecting the second control while the portion of the live stream is being displayed:
  requesting, by the client device from the server, content of the live stream not included in the portion; and
  displaying, by the client device, the content of the live stream in lieu of the requested video content based on receiving the content of the live stream from the server.

17. The method of claim 16, wherein the live stream is a transcoded version of an original live stream received from a content distributor.

* * * * *